UNITED STATES PATENT OFFICE.

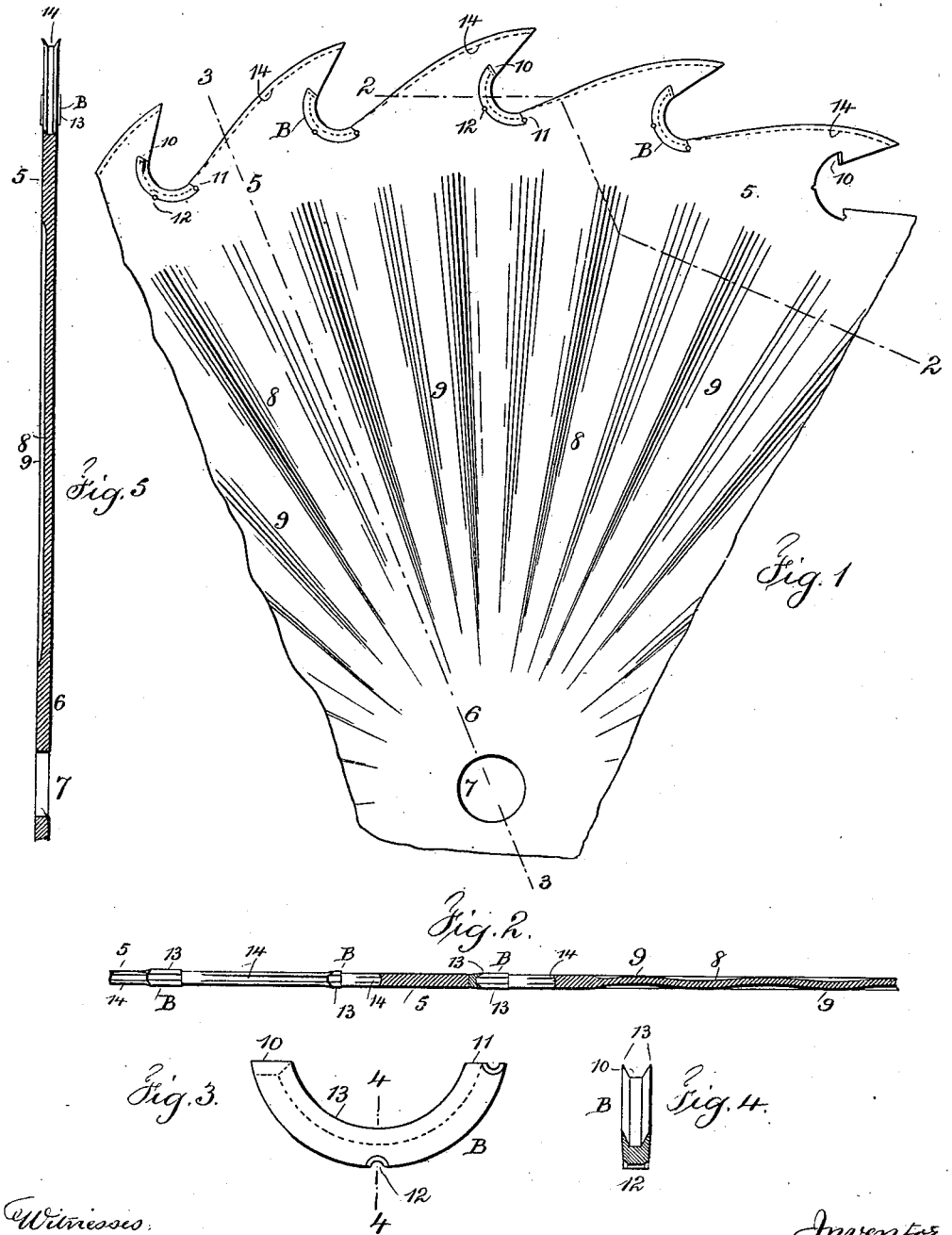

DEWEY PHILLIPS, OF ARLINGTON, VERMONT.

SAW.

SPECIFICATION forming part of Letters Patent No. 646,373, dated March 27, 1900.

Application filed July 29, 1898. Serial No. 687,167. (No model.)

*To all whom it may concern:*

Be it known that I, DEWEY PHILLIPS, a citizen of the United States, residing at East Arlington, in the county of Bennington and State of Vermont, have invented an Improvement in Saws, of which the following is a specification.

In the manufacture of circular saws the middle portion of the saw has been reduced in thickness by grinding, so as to lessen the friction of the saw upon the wood; but in use it is found that the rim of the saw is liable to become warm and to expand, and the middle portion of the saw not becoming warm causes the rim of the saw to become undulating by the expansion.

The present invention is made with reference to allowing the rim of the saw to expand if it becomes warm while in use and still retain its accurate shape as a plain flat surface, and I also provide in the throats of the saw-teeth detachable throat-pieces having V-shaped grooved surfaces, so that curved cutting edges are formed by the throat-pieces, the object being to maintain uniformity in the width of the kerf and smooth surfaces upon the wood and receive the sawdust, so that the teeth may not be crowded in the kerf and the saw heated by friction.

In the drawings, Figure 1 is a side view showing a part of a circular saw, and Fig. 2 is a section at the line 2 2. Fig. 3 is a side view, and Fig. 4 a cross-section at the line 4 4, showing the detachable throat-piece; and Fig. 5 is a section at the line 3 3 of Fig. 1.

The saw-plate is of any desired size and thickness, the outer portion 5 of the plate being maintained of the full thickness of the plate, and the inner portion 6, around the eyes 7, also being of full thickness, or nearly so. The intermediate portions of the plate are reduced in thickness, as shown at 8; but if these features only were made use of it would not be possible to maintain the edge portion of the saw perfectly true if it became heated. I therefore employ undulations 9 in the thinner portion of the saw, said undulations being radial, or substantially so, in order that such undulations may spring or yield to an expansion of the outer portion of the saw.

I prefer to make the undulations 9 radial, and according to the size of the saw these undulations can be more or less numerous, and they may be formed in the grinding up of the saw, as illustrated in Fig. 2, or such undulations may be produced by hammering the thinner portion of the saw, care being taken that the convex portions of the undulations do not extend beyond the plane of the surface of the saw at either side, and it is generally preferable to have these undulations uniform all around the saw; but such undulations may alternate, the convex portions on one side being between the concave portion at that side, the convex portion projecting at the other side, thereby balancing and unifying the elasticity of the saw in the direction of the radii, so that the middle portions of the saw may be expanded by the tension of the outer portions of the saw if the same becomes heated and so increased in size, and the resiliency of the metal will cause the inner and thinner portions of the saw to contract as the rim may become smaller when the temperature is reduced.

The teeth of the saw are to be made of any desired character and may be either integral with the saw-plate or separate, as both forms of teeth are well known, and the shape of the cutting edges of the teeth may also be varied as occasion requires; but in the throat portion of each tooth or of any desired number of teeth around the saw recesses are made for the reception of the detachable throat-pieces B. These detachable throat-pieces are made as arcs of circles or ellipses with inclined ends, and these set into corresponding recesses, and one end 10 of each detachable throat-piece is V-shaped to set into a corresponding end portion of the recess either in the saw-plate or the ordinary detachable throat-plate, and at the end 11 a rivet is to be inserted, passing through a hole partly in the detachable throat-piece and partly in the saw-plate or throat-plate, so as to hold the detachable throat-piece firmly in position, and a second rivet at 12 is usually employed to insure the stability of the detachable throat-piece.

The concave surface of the throat-piece is grooved advantageously with inclined sides and a flat bottom to the groove, as shown in Fig. 4. Thereby cutting edges 13 are formed upon the concave side of the detachable throat-piece, and these detachable throat-pieces can be made of tool-steel, so as to be sharpened and retain their cutting edges, and the outer surfaces of the detachable throat-pieces should be slightly beveled, so that the cutting edges 13 will be the widest portions of the detachable throat-pieces.

In practical use it is found that almost all circular saws leave ridges to a greater or less extent upon the surfaces of the wood at the sides of the saw-kerf, and these detachable throat-pieces become smoothing-cutters for removing such ridges and planing the surfaces of the wood at the kerf, thereby leaving the surfaces sawed in a smooth or planed condition, and, as these detachable throat-pieces cut at each side of the kerf, there is no tendency to loosen such detachable throat-pieces or to produce friction upon the saw, and the saw will run straight even when ripping crooked timber. I also prefer to groove the edges of the saw-plate to the rear of each cutting point or tooth, as shown at 14, the object of such groove being to lessen the risk of the sawdust passing down between the sides of the saw and the sides of the kerf, the sawdust accumulating in such grooves 14 and being thrown off centrifugally and peripherally as soon as the groove passes out of the wood that is being sawed, and I prefer to make such grooves of a shape corresponding to the grooves in the detachable throat-pieces.

It will be apparent that where the teeth are integral with the saw-plate, as represented, the peripheral grooves 14 in the edge of the saw allow the cutting-points of the teeth to be wider than the thickness of the saw, because the metal of the saw can be easily spread immediately at the cutting ends of the teeth by a tool driven into the V-shaped groove of the saw, and in this manner a set can be made upon the saw-teeth from time to time, as required, so that the teeth cut a kerf that is slightly wider than the thickness of the saw-plate.

I claim as my invention—

1. A circular-saw plate of uniform thickness adjacent to the eye and at the rim or nearly so, and with the intermediate portion thinner and provided with undulations that form the thin portion of the saw into springs that allow the exterior of the saw to expand if it becomes warm without throwing the saw out of line, substantially as set forth.

2. A circular-saw plate of uniform thickness adjacent to the eye and at the rim or nearly so, and with the intermediate portion thinner and provided with radial undulations that form the thin portion of the saw into springs that allow the exterior of the saw to expand if it becomes warm without throwing the saw out of line, substantially as set forth.

3. The circular saw having recesses in the throats of the teeth and detachable throat-pieces inserted in the recesses and secured therein, the concave sides of such throat-pieces being grooved or channeled so that the edges of the detachable throat-pieces become cutters for smoothing the surfaces of the wood at the kerf, substantially as set forth.

Signed by me this 25th day of July, 1898.

DEWEY PHILLIPS.

Witnesses:
HAROLD SERRELL,
S. T. HAVILAND.